(12) United States Patent
Burns

(10) Patent No.: US 8,955,335 B2
(45) Date of Patent: Feb. 17, 2015

(54) SYSTEM, PROPULSION SYSTEM AND VEHICLE

(75) Inventor: Donald W. Burns, Avon, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 13/338,833

(22) Filed: Dec. 28, 2011

(65) Prior Publication Data

US 2012/0216549 A1  Aug. 30, 2012

Related U.S. Application Data

(60) Provisional application No. 61/428,707, filed on Dec. 30, 2010.

(51) Int. Cl.
*F02C 7/268* (2006.01)
*F02C 7/32* (2006.01)
*B64D 35/00* (2006.01)
*B64D 41/00* (2006.01)
*B64D 13/06* (2006.01)

(52) U.S. Cl.
CPC . *F02C 7/32* (2013.01); *B64D 35/00* (2013.01); *B64D 41/00* (2013.01); *B64D 2013/0611* (2013.01); *B64D 2013/0618* (2013.01); *B64D 2041/002* (2013.01); *Y02T 50/56* (2013.01)
USPC ............................................. 60/787; 60/801

(58) Field of Classification Search
CPC .............. B64D 2013/0611; B64D 2013/0618; B64D 2041/002; B64D 35/00; B64D 41/00; F02C 7/32

USPC ............ 60/39.181, 786–788, 801; 33/39.181, 33/786–788, 801
See application file for complete search history.

(56) References Cited

U.S. PATENT DOCUMENTS 3,487,993 A * 1/1970 Rannenberg .................... 415/28
4,062,186 A * 12/1977 Snow et al. .................. 60/226.1
(Continued)

FOREIGN PATENT DOCUMENTS

| EP | 1 908 941 | 4/2008 |
| WO | 2008082335 | 7/2008 |
| WO | WO 2010/075923 | 7/2010 |

OTHER PUBLICATIONS

International Search Report and Written Opinion, PCT/US2011/067815, Rolls-Royce Corporation, Apr. 24, 2012.
(Continued)

*Primary Examiner* — Phutthiwat Wongwian
(74) *Attorney, Agent, or Firm* — Krieg DeVault LLP

(57) ABSTRACT

A system, which may be a propulsion system or a vehicle having a propulsion system, for example, an air-vehicle, a land vehicle or a marine vehicle, includes a gas turbine engine operative to drive a propulsor. The propulsor may be, for example, a fan/turbofan, a propeller, a turbine, or any rotor system for propelling an aircraft; a system for providing tractive effort for a land vehicle, such as one or more transmissions and wheel/track systems; and/or may be one or more marine propulsive devices, such as shrouded or unshrouded propellers, hydrojets and/or jet-pumps for surface vessels and/or submarines. The system also includes an auxiliary power unit. The auxiliary power unit is coupled to the gas turbine engine, and is operative to supply rotational power to the propulsor and to the impart motion to the vehicle using the propulsor, without starting the gas turbine engine.

20 Claims, 3 Drawing Sheets

(56) References Cited

U.S. PATENT DOCUMENTS

| | | | |
|---|---|---|---|
| 5,143,329 A * | 9/1992 | Coffinberry | 244/209 |
| 5,253,470 A * | 10/1993 | Newton | 60/39.08 |
| 5,363,641 A * | 11/1994 | Dixon et al. | 60/778 |
| 5,555,722 A | 9/1996 | Mehr-Ayin et al. | |
| 6,247,668 B1 | 6/2001 | Reysa et al. | |
| 6,278,262 B1 | 8/2001 | Ullyott | |
| 6,283,410 B1 | 9/2001 | Thompson | |
| 6,305,156 B1 * | 10/2001 | Lui | 60/785 |
| 7,207,521 B2 * | 4/2007 | Atkey et al. | 244/58 |
| 7,251,942 B2 * | 8/2007 | Dittmar et al. | 60/788 |
| 7,481,062 B2 * | 1/2009 | Gaines et al. | 60/792 |
| 7,937,949 B2 * | 5/2011 | Eccles et al. | 60/786 |
| 8,336,289 B2 * | 12/2012 | Roberge | 60/263 |
| 2002/0162914 A1 | 11/2002 | Albero et al. | |
| 2004/0129835 A1 | 7/2004 | Atkey et al. | |
| 2004/0144096 A1 | 7/2004 | Wollenweber | |
| 2006/0034693 A1 | 2/2006 | Lardellier | |
| 2006/0042252 A1 | 3/2006 | Derouineau | |
| 2006/0260323 A1 | 11/2006 | Moulebhar | |
| 2007/0101721 A1 | 5/2007 | Dooley et al. | |
| 2007/0151258 A1 * | 7/2007 | Gaines et al. | 60/792 |
| 2008/0217466 A1 | 9/2008 | Bhargava | |
| 2009/0007569 A1 | 1/2009 | Lemmers et al. | |
| 2009/0072080 A1 * | 3/2009 | Bhargava | 244/58 |
| 2009/0173821 A1 | 7/2009 | Bhargava | |
| 2009/0255270 A1 * | 10/2009 | Rensch | 60/784 |
| 2009/0288421 A1 | 11/2009 | Zeiner et al. | |
| 2009/0302152 A1 | 12/2009 | Knight | |
| 2010/0024434 A1 * | 2/2010 | Moore et al. | 60/788 |
| 2012/0119020 A1 * | 5/2012 | Burns et al. | 244/58 |
| 2012/0119021 A1 * | 5/2012 | Burns et al. | 244/58 |

OTHER PUBLICATIONS

Extended European Search Report, European Patent Application No. 11853135.9, Rolls-Royce Corporation, Dec. 3, 2014.

* cited by examiner

SYSTEM, PROPULSION SYSTEM AND VEHICLE

CROSS REFERENCE TO RELATED APPLICATIONS

The present application claims benefit of U.S. Provisional Patent Application No. 61/428,707, filed Dec. 30, 2010, entitled SYSTEM, PROPULSION SYSTEM AND VEHICLE, which is incorporated herein by reference.

FIELD OF THE INVENTION

The present invention relates to powered systems, and more particularly, gas turbine powered systems, propulsion systems and vehicles.

BACKGROUND

Propulsion systems that effectively use gas turbine engines as sources of power, remain an area of interest. Some existing systems have various shortcomings, drawbacks, and disadvantages relative to certain applications. Accordingly, there remains a need for further contributions in this area of technology.

SUMMARY

One embodiment of the present invention is a unique vehicle. Another embodiment is a unique propulsion system. Yet another embodiment is a unique system. Other embodiments include apparatuses, systems, devices, hardware, methods, and combinations for vehicle propulsions systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
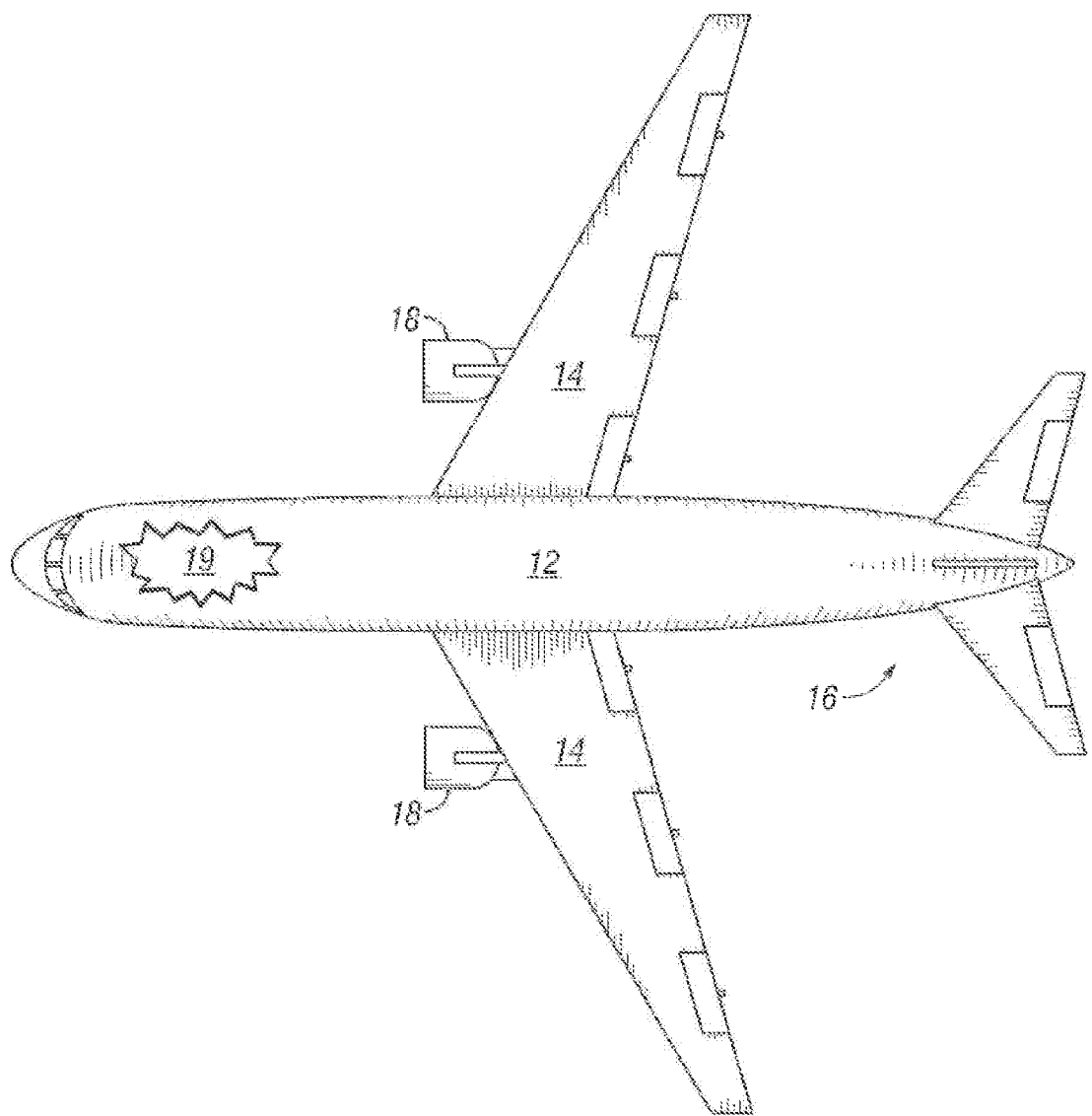
FIG. 1 schematically illustrates some aspects of a non-limiting example of one of many types of vehicles in accordance with an embodiment of the present invention.

For purposes of promoting an understanding of the principles of the invention, reference will now be made to the embodiments illustrated in the drawings, and specific language will be used to describe the same, it will nonetheless be understood that no limitation of the scope of the invention is intended by the illustration and description of certain embodiments of the invention, in addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there are illustrated some aspects of a non-limiting example of a vehicle 10 in accordance with an embodiment of the present invention. In one form, vehicle 10 is an aircraft, referred to herein as aircraft 10. In other embodiments, vehicle 10 may be any type of engine powered vehicle, including one or more types of air-vehicles: land vehicles, including and without limitation, tracked and/or wheeled vehicles; marine vehicles, including and without limitation, surface vessels, submarines and/or semi-submersibles; amphibious vehicles, or any combination of one or more types of air, marine and land vehicles. In various forms, vehicle 10 may be manned and/or autonomous.

In one form, aircraft 10 includes a fuselage 12, wings 14, an empennage 16 and propulsion systems 13. In one form, aircraft 10 is a twin engine turbofan aircraft, in other embodiments, aircraft 10 may be any fixed-wing aircraft, including turbofan aircraft and turboprop aircraft. In various embodiments, aircraft 10 may take various forms, including, without limitation, fixed-vying aircraft, rotary wing aircraft and/or lighter-than-air aircraft. In various embodiments, aircraft 10 may have a single propulsion system 18 or a plurality of propulsion systems 18, in various embodiments, aircraft 10 may employ any number of wings 14, or may not include any wings. Empennage 16 may employ a single flight control surface or multiple flight control surfaces, or may not be included in some embodiments. In one form, aircraft 10 includes a cabin 19. In one form, cabin 19 is configured to hold, for example and without limitation, one or more pilots, technicians, weapon or other specialists and/or passengers, and is positioned in fuselage 12. In various embodiments, cabin 19 may be configured to hold any type of payload, human and/or nonhuman, and may be pressurized and/or nonpressurized. Although depicted in the form of an aircraft cabin, in other embodiments, cabin 19 may be any air-vehicle, land vehicle and/or marine vehicle cabin.

Figure 2:
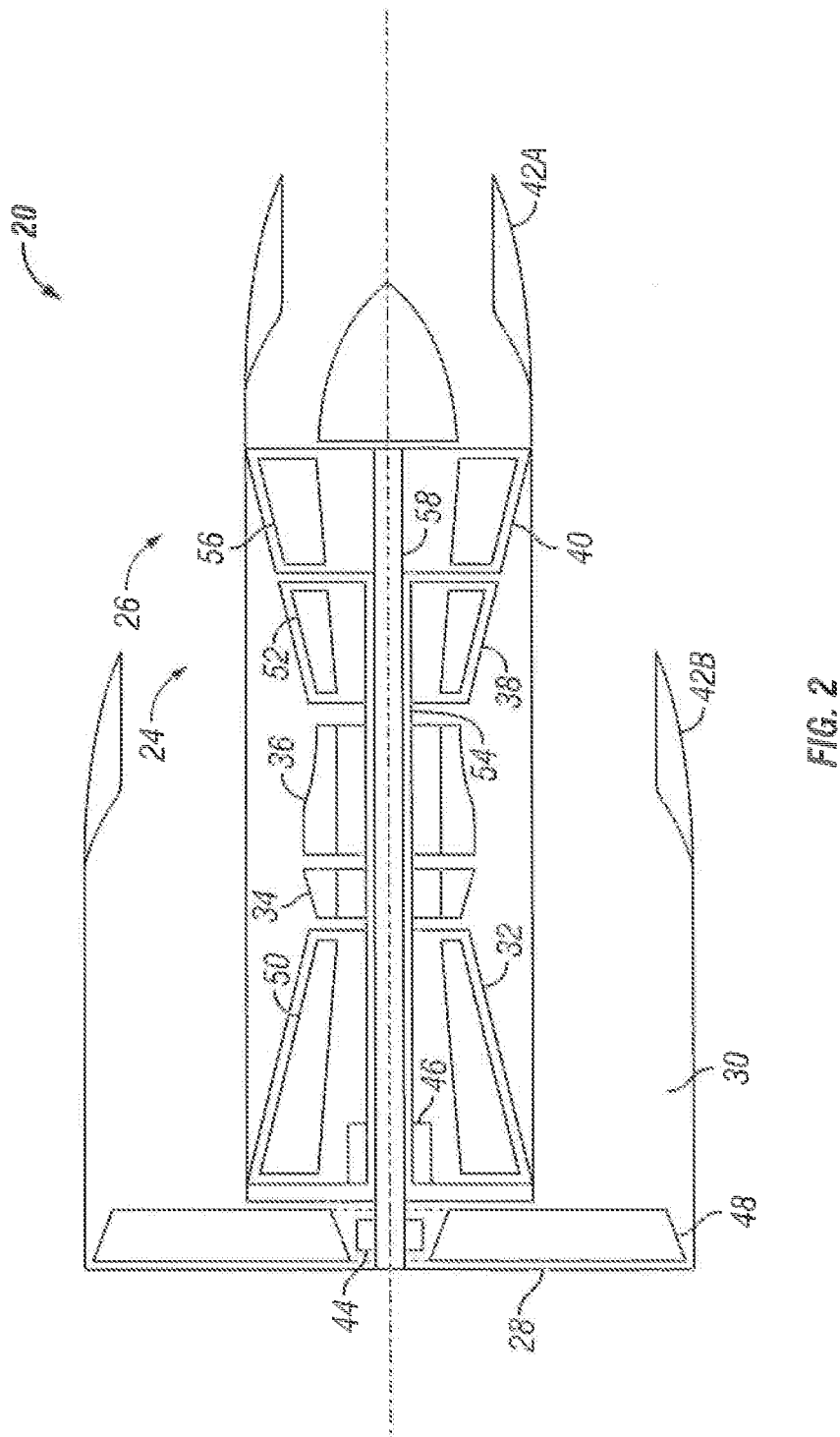
FIG. 2 schematically illustrates some aspects of a non-limiting example of a propulsion system for a vehicle in accordance with an embodiment of the present invention.

Referring to FIG. 2, there are illustrated some aspects of a non-limiting example of propulsion system 18 in accordance with an embodiment of the present invention. Propulsion system 18 includes a gas turbine engine 20 and an auxiliary power unit 22 (APU 22). Although described herein as with respect to an aircraft propulsion system, in other embodiments, propulsion system 18 may be a propulsion system for providing propulsive thrust to one or more other types of vehicles, e.g., air-vehicles; land vehicles, including tracked and/or wheeled vehicles (e.g., battle tanks); marine vehicles, including surface vessels, submarines and/or semi-submersibles; amphibious vehicles; or any combination of one or more types of air, marine and land vehicles. The propulsive thrust provided by propulsion system 18 for an air vehicle in the form of one or more fast moving streams of air generated by one or more propulsors, for example and without limitation, one or more turbofans, propellers, turbines, propfans and/or other rotor systems that generate thrust. The propulsive thrust provided by propulsion system 18 to land-based vehicles may include the tractive effort provided via one or more propulsors in the form of, for example and without limitation, wheels and/or tracks, e.g., using one or more transmissions. The propulsive thrust provided by propulsion system 18 to a marine vehicle may be in the form of one or more fast moving streams of water generated by one or more propulsors in the form of, for example and without limitation, one or more propellers, shrouded and/or not shrouded; hydro-jets and/or jet-pumps.

In one form, APU 22 is a secondary gas turbine engine. In other embodiments, APU 22 may be one or more other types of thermodynamic machines configured to generate mechanical power from fuel, which may be used to drive other mechanical and/or electro-mechanical machines, e.g., including generators, refrigeration systems, thermal management systems and/or any other type of machine. For example, in some embodiments, APU 22 may be a turbocharged, supercharged and/or normally aspirated piston engine or a hybrid engine.

In the form of an aircraft engine, engine 20 is a primary propulsion engine that provides thrust for flight operations of aircraft 10. In one form, engine 20 is a two spool engine having a high pressure spool 24 and a low pressure spool 26. In other embodiments, engine 20 may include three or more spools. In one form, engine 20 is a turbofan engine, wherein low pressure spool 26 powers a propulsor 28 in the form of a turbofan (fan) system, referred to herein as a turbofan or a fan system, which is configured to impart motion to aircraft 10 during normal aircraft moving operations, e.g., flying aircraft 10 through air. In other embodiments, engine 20 may be a turboprop engine, wherein low pressure spool 26 powers a propulsor 28 in the form of a propeller system (not shown), e.g., via a reduction gearbox (not shown). In one form, a single engine 20 is coupled to each wing 14 of aircraft 10. In other embodiments, more than one engine 20 may be coupled to each wing 14. In still other embodiments, one or more engines 20 may be coupled to the fuselage or the empennage in addition to or in place of wing-mounted engines 20. In embodiments wherein the vehicle is a land-based vehicle, propulsor 28 may be, for example and without limitation, a wheel and/or track drive system configured to impart motion to the vehicle during normal vehicle moving operations, e.g., driving the vehicle across surfaces. In embodiments wherein the vehicle is a marine vehicle, propulsor 28 may be, for example and without limitation, one or more propellers, shrouded and/or not shrouded; hydrojets and/or jet-pumps configured to impart motion to the vehicle during normal vehicle moving operations, e.g., driving the vehicle through water.

In one form, engine 20 includes, in addition to fan system 28, a bypass duct 30, a compressor system 32. a diffuser 34, a combustion system 36, a high pressure (HP) turbine system 38, a low pressure (LP) turbine system 40, a nozzle 42A, and a nozzle 42B. In other embodiments, there may be, for example, an intermediate pressure spool having an intermediate pressure turbine system. In various embodiments, engine 20 may also include an electrical machine 44 coupled to low pressure spool 26 and an electrical machine 46 coupled to high pressure spool 24, in one form, each of electrical machines 44 and 46 are operative to convert mechanical power to electrical power, and to convert electrical power to mechanical power, e.g., as in a motor/generator. Other embodiments may not include an electrical machine on low pressure spool 26 and/or high pressure spool 24.

In the depicted embodiment, the engine core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and compressor system 32 are in fluid communication with fan system 28. Nozzle 42B is in fluid communication with bypass duct 30. Diffuser 34 is in fluid communication with compressor system 32. Combustion system 36 is fluidly disposed between compressor system 32 and turbine system 38. Turbine system 40 is fluidly disposed between turbine system 38 and nozzle 42B. In one form, combustion system 36 includes a combustion liner (not shown) that contains a continuous combustion process. In other embodiments, combustion system 36 may take other forms, and may be, for example, a wave rotor combustion system, a rotary valve combustion system, or a slinger combustion system, and may employ deflagration and/or detonation combustion processes.

Fan system 28 includes a fan rotor system 48. In various embodiments, fan rotor system 48 includes one or more rotors (not shown) that are powered by turbine system 40. Fan system 28 may include one or more vanes (not shown). Bypass duct 30 is operative to transmit a bypass flow generated by fan system 28 around the core of engine 20. Compressor system 32 includes a compressor rotor system 50. In various embodiments, compressor rotor system 50 includes one or more rotors (not shown) that are powered by turbine system. Turbine system 38 includes a turbine rotor system 52. In various embodiments, turbine rotor system 52 includes one or more rotors (not shown) operative to drive compressor rotor system 50. Turbine rotor system 52 is drivingly coupled to compressor rotor system 50 via a shafting system 54. Turbine system 40 includes a turbine rotor system 56. In various embodiments, turbine rotor system 56 includes one or more rotors (not shown) operative to drive fan rotor system 48. Turbine rotor system 56 is drivingly coupled to fan rotor system 48 via a shafting system 58. In various embodiments, shafting systems 54 and 58 include a plurality of shafts that may rotate at the same or different speeds and directions. In some embodiments, only a single shaft may be employed in one or both of shafting systems 54 and 58. Turbine system 40 is operative to discharge an engine 20 core flow to nozzle 42A.

During normal operation of gas turbine engine 20, air is drawn into the inlet of fan system 28 and pressurized by fan rotor system 48. Some of the air pressurized by fan rotor system 48 is directed into compressor system 32 as core flow, and some of the pressurized air is directed into bypass duct 30 as bypass flow. Compressor system 32 further pressurizes the portion of the air received therein from fan system 28, which is then discharged into diffuser 34. Diffuser 34 reduces the velocity of the pressurized air, and directs the diffused core airflow into combustion system 36. Fuel is mixed with the pressurized air in combustion system 36, which is then combusted. The hot gases exiting combustion system 36 are directed into turbine systems 38 and 40, which extract energy in the form of mechanical shaft power to drive compressor system 32 and fan system 28 via respective shafting systems 54 and 58.

Figure 3:
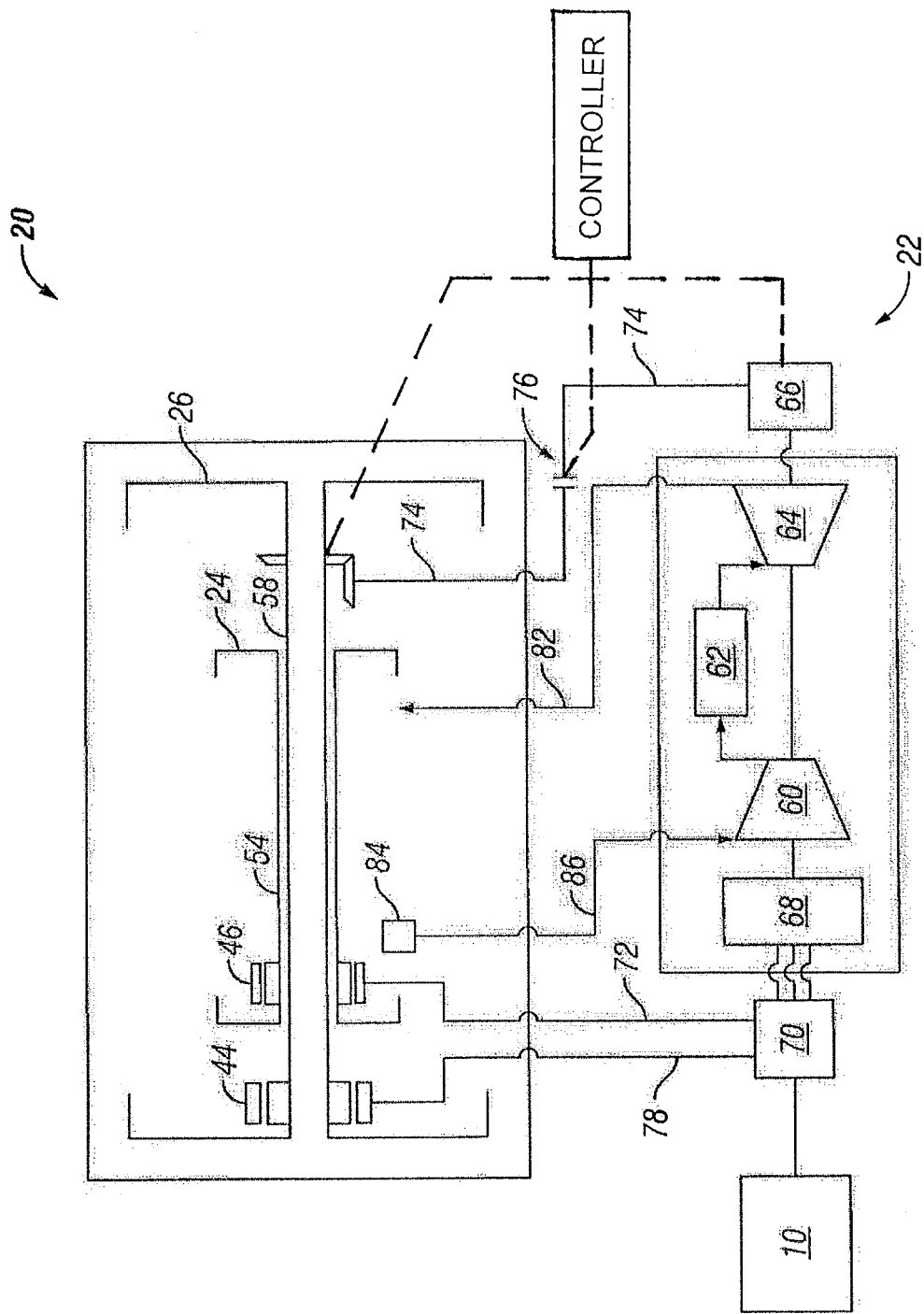
FIG. 3 schematically illustrates some aspects of a non-limiting example of a propulsion system for a vehicle in accordance with an embodiment of the present invention.

Referring to FIG. 3, some aspects of a non-limiting example APU 22 and some of its connections to engine 20 in accordance with an embodiment of the present invention is schematically depicted. APU 22 is coupled to low pressure spool 26. APU 22 is operative to supply mechanical rotational power to low pressure spool 26 for taxiing aircraft 10 without starting engine 20. In one form APU 22 is coupled to low pressure spool 26 via shaft 58, to directly drive low pressure spool 26. In other embodiments, other arrangements may be employed to drive low pressure spool 26 using shaft power generated by APU 22. In still other embodiments, APU 22 may be coupled to any engine 20 spool for directly driving such spool, including the single spool of a single spool engine or any spool of a multispool engine.

In one form, APU 22 is configured to supply rotational power to low pressure spool 26 to provide sufficient thrust to taxi aircraft 10 without starting one or more engines 20. In one form, the taxiing thrust is produced by propulsor 28. In other embodiments, APU 22 may be configured to supply rotational power to generate thrust for other vehicle types, e.g., vehicle types as mentioned above.

In one form, APU 22 includes an APU compressor 60, an APU combustor 62, an APU turbine 64, a reduction gearbox 66 and an electrical machine 68. In other embodiments, APU 22 may take one or more other forms. The discharge of compressor 50 is in fluid communication with combustor 62. The discharge of combustor 62 is in fluid communication with turbine 64. Turbine 64 is coupled to compressor 60 and operative to drive compressor 60. In one form, reduction gearbox 66 is coupled to and driven by turbine 64. In other embodiments, reduction gearbox 66 may be coupled to compressor 60 and driven by turbine 64 via compressor 60 or a shaft extending from turbine 64. In one form, reduction gearbox 66 is considered a part of APU 22. In other embodiments, reduction gearbox 66 may be considered a separate component that is powered by APU 22. For example, in one form, gearbox 66 may be an accessory gearbox of engine 20, whereas in another form, gearbox 66 may be coupled to a separate accessory gearbox of engine 20. In one form, electrical machine 68 is coupled to compressor 60. In other embodiments, other mechanical arrangements may be employed. For example, electrical machine 68 may be coupled directly to turbine 64.

Electrical machine 68 is operative to convert mechanical power received from APU 22 into electrical power. In some embodiments, electrical machine 68 may be also configured to convert electrical power to mechanical power, e.g., for starting APU 22. In some embodiments, a power conditioner 70 is electrically coupled to electrical machine 68 and operative to condition the power output of electrical machine 38, e.g., for use in supplying electrical power to one or more systems of aircraft 10 during aircraft 10 ground operations and/or flight operations. In some embodiments, electrical machine 68 is configured to provide electrical power to drive electrical machine 44 and/or electrical machine 46. For example, in one form, power generated by electrical machine 68 may be employed to start or to aid in the starting of engine 20 by providing electrical power to electrical machines 44 and/or 46. In the depiction of FIG. 3, a line 72 indicates an electrical coupling of electrical machine 46 to power conditioning unit 70 for supply power from electrical machine 68 to electrical machine 44. A line 78 indicates an electrical coupling of electrical machine 44 to power conditioning unit 70 for supply power from electrical machine 68 to electrical machine 44. In various embodiments, electrical machine 68 may be electrically coupled to electrical machine 44 and/or electrical machine 46. In still other embodiments, electrical machine 68 may not be electrically coupled to either of electrical machine 44 and electrical machine 46. In yet other embodiments, engine 20 may not include one or both of electrical machine 44 and electrical machine 46.

Reduction gearbox 66 is mechanically coupled to low pressure spool 26 via a shafting system 74, and is operative to drive low pressure spool 26. In one form, a clutch 76 is disposed between low pressure spool 26 and reduction gearbox 66. In some embodiments, a transmission may be coupled between low pressure spool 26 and reduction gearbox 66, e.g., in addition to or in place of clutch 76. Clutch 76 is configured to mechanically engage and disengage APU 22 from low pressure spool 26 of the gas turbine engine 20, e.g., in response to pilot commands or control inputs from an aircraft and/or engine controller. In one form, clutch 76 engages APU 22 to low pressure spool 26 for performing aircraft 10 taxi operation. In one form, clutch 76 disengages APU 22 from low pressure spool 26 during one or more of takeoff, cruise and landing nodes. In other embodiments, clutch 76 may engage APU 22 with low pressure spool 26 during one or more of takeoff, cruise and landing modes, e.g., to provide supplemental power to low pressure spool 26. Some embodiments may employ an overrunning (sprag) clutch between APU 22 and low pressure spool 26.

During operation, APU 22 generates an exhaust flow. In one form, APU 22 exhaust flow is directed to engine 20, e.g., high pressure spool 24 (and/or low pressure spool 26) in order to warm engine 20 prior to engine start, which may reduce the amount of time it takes to start engine 20. The APU 22 exhaust flow to engine 20 is illustrated as line 82 in FIG. 3. In various embodiments, valves and ducting (not shown) and/or other arrangements may be employed to direct the APU 22 exhaust flow to engine 20.

During operation, engine 20 generates a bleed flow, e.g., from high pressure spool 24. The bleed flow is discharged from high pressure spool 24 through a bleed port 84. In some embodiments, the bleed flow is directed into APU compressor 60, indicated in FIG. 3 by line 86, which increases the efficiency of APU 22, and which may reduce emissions from APU 22. The bleed flow may be supplied via valves and ducting (not shown) and/or by other arrangements. The bleed flow may be supplied from high pressure spool 24 during aircraft 10 flight or ground operations, including prior to engine 20 start.

In one form, APU 22 is configured to start or aid in the starting of engine 20 by supplying mechanical power to rotate low pressure spool 26 and/or by supplying electrical power to one or both of electrical machines 44 and 46 (in embodiments so equipped). In one form, engine 20 is started following the completion of taxiing operations of aircraft 10. In other embodiments, engine 20 may be started during taxiing operations.

Propulsion system 18 is configured to provide sufficient thrust to taxi aircraft 10 without starting engines 20, which may result in fuel savings during taxi operations, since APU 22 is generally more efficient than engine 20 at thrust levels associated with taxiing aircraft 10. Once aircraft 10 has reached a position where it is desirable to prepare for takeoff, engines 20 may be started, and declutched from APUs 22.

By employing APU 22 to provide rotational power to low pressure spool 26 and hence propulsor 28, sufficient thrust may be provided for taxiing aircraft 10 without starting engines 20, which may result in a fuel savings by the operator of aircraft 10. In addition, in some embodiments, because APU 22 may be used to start engine 20, the need for a pneumatic starter may be eliminated.

Embodiments of the present invention include a propulsion system for a vehicle, comprising: a gas turbine engine having a spool configured to drive a propulsor, wherein the propulsor is configured to impart motion to the vehicle during normal vehicle moving operations; and an auxiliary power unit (APU) mechanically coupled to the spool, wherein the APU is operative to supply rotational power to spool.

In a refinement, the propulsion system further comprises a gearbox mechanically disposed between the APU and the spool.

In another refinement, the gearbox is configured to reduce an output speed of the APU.

In yet another refinement, the APU is a second gas turbine engine.

In still another refinement, the gas turbine engine includes an accessory gearbox: and wherein the APU is mechanically coupled to the accessory gearbox for driving the spool via the accessory gearbox.

In yet still another refinement, the vehicle is an air vehicle.

In a further refinement, the APU generates an exhaust, and the exhaust is supplied to the gas turbine engine to warm up the gas turbine engine prior to engine start.

In a yet further refinement, the propulsion system further comprises a clutch mechanically coupled between the APU and the gas turbine engine, wherein the clutch is configured to mechanically disengage the APU from the spool.

In a still further refinement, the APU includes an APU intake; wherein the gas turbine engine generates a bleed air flow; and wherein the bleed air flow is supplied to the APU intake.

In a yet still further refinement, the propulsion system further comprises a generator coupled to the APU, wherein the generator is configured to supply electrical power to the vehicle when the gas turbine engine is not running.

In another further refinement, the APU is configured to start the gas turbine engine by supplying mechanical power to rotate the spool.

In yet another further refinement, the gas turbine engine is a turbofan engine, and the propulsor is a turbofan of the turbofan engine.

Embodiments of the present invention include a vehicle, comprising: a cabin; a propulsion system, including: a propulsor configured to impart motion to the cabin, a gas turbine engine having a spool, wherein the spool is operative to drive the propulsor; and wherein the gas turbine engine is coupled at least indirectly to the cabin; an auxiliary power unit (APU) operative to supply mechanical power to the gas turbine engine via a reduction gearbox; and a shafting system mechanically coupling the spool to the reduction gearbox, wherein the APU is operative to supply rotational power to the spool via the shafting system and reduction gearbox.

In a refinement, the vehicle further comprises a gearbox mechanically coupled between the APU and the spool.

In another refinement, the power mechanically transferred from the APU to the gas turbine engine is configured to supply thrust sufficient for imparting notion to the vehicle.

In yet another refinement, the vehicle is an air vehicle.

In still another refinement, the gas turbine engine is a turbofan engine, and wherein the propulsor is a turbofan of the turbofan engine.

Embodiments of the present invention include a system, comprising: a gas turbine engine having a spool is operative to drive a propulsor; and means for supplying mechanical power to the spool, wherein the means for supplying mechanical power is operative to supply rotational power to the spool.

In a refinement, the means for supplying mechanical power includes an auxiliary power unit (APU).

In another refinement, the APU is a second gas turbine engine.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking he same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A propulsion system for a vehicle, comprising:
    a gas turbine engine having a high pressure spool and a low pressure spool, wherein the low pressure spool is configured to mechanically drive a propulsor, wherein the propulsor is configured to impart motion to the vehicle during normal vehicle moving operations; and
    an auxiliary power unit (APU) mechanically coupled to only the low pressure spool, wherein the APU is a thermodynamic machine operative to mechanically supply rotational power to the propulsor; and
    a controller configured to selectively engage the APU to the low pressure spool to impart the motion of the vehicle without starting the gas turbine engine.

2. The propulsion system of claim 1, further comprising a gearbox mechanically disposed between the APU and the spool.

3. The propulsion system of claim 2, wherein the gearbox is configured to reduce an output speed of the APU.

4. The propulsion system of claim 1, wherein the APU is a second gas turbine engine.

5. The propulsion system of claim 1, wherein the gas turbine engine includes an accessory gearbox; and wherein the APU is mechanically coupled to the accessory gearbox for driving the spool via the accessory gearbox.

6. The propulsion system of claim 1, wherein the vehicle is an air vehicle.

7. The propulsion system of claim 1, wherein the APU generates an exhaust, and wherein the exhaust is supplied to the gas turbine engine to warm up the gas turbine engine prior to engine start.

8. The propulsion system of claim 1, further comprising a clutch mechanically coupled between the APU and the gas turbine engine, wherein the clutch is configured to mechanically disengage the APU from the spool.

9. The propulsion system of claim 1, wherein the APU includes an APU intake; wherein the gas turbine engine generates a bleed air flow; and wherein the bleed air flow is supplied to the APU intake.

10. The propulsion system of claim 1, further comprising a generator coupled to the APU, wherein the generator is configured to supply electrical power to the vehicle when the gas turbine engine is not running.

11. The propulsion system of claim 1, wherein the APU is configured to start the gas turbine engine by supplying mechanical power to rotate the spool.

12. The propulsion system of claim 1, wherein the gas turbine engine is a turbofan engine, and wherein the propulsor is a turbofan of the turbofan engine.

13. A vehicle, comprising:
    a cabin;
    a propulsion system, including:
    a propulsor configured to impart motion to the cabin.
    a gas turbine engine having a high pressure spool and a low pressure spool, wherein the low pressure spool is operative to mechanically drive the propulsor; and
    wherein the gas turbine engine is coupled at least indirectly to the cabin;
    an auxiliary power unit (APU) operative to supply mechanical power to the gas turbine engine via a reduction gearbox;
    wherein the high pressure spool is configured to mechanically drive an upstream high pressure compressor system and a downstream high pressure turbine system;
    a shafting system mechanically coupling only the low pressure spool aft of the high pressure turbine system to the reduction gearbox, wherein the APU is a thermodynamic machine operative to supply rotational power to the propulsor via the shafting system and reduction gearbox.

14. The vehicle of claim 13 further comprising a gearbox mechanically coupled between the APU and the spool.

15. The vehicle of claim 13, wherein the power mechanically transferred from the APU to the gas turbine engine is configured to supply thrust sufficient for imparting motion to the vehicle.

16. The vehicle of claim 13, wherein the vehicle is an air vehicle.

17. The vehicle of claim 13, wherein the gas turbine engine is a turbofan engine, and wherein the propulsor is a turbofan of the turbofan engine.

18. A system, comprising:
a gas turbine engine having a high pressure spool, and a low pressure spool operative to mechanically drive a propulsor;
wherein the high pressure spool is configured to mechanically drive an upstream high pressure compressor system and a downstream high pressure turbine system;
means for supplying mechanical power to the low pressure spool, wherein the means for supplying mechanical power is coupled to only the low pressure spool aft of the high pressure turbine system, wherein the means for supplying power is a thermodynamic machine; and
a controller configured to selectively engage the means for supplying mechanical power to the low pressure spool to impart the motion of a vehicle without starting the gas turbine engine.

19. The system of claim 18, wherein the means for supplying mechanical power includes an auxiliary power unit (APU).

20. The system of claim 19, wherein the APU is a second gas turbine engine.

* * * * *